Patented Apr. 25, 1939

2,156,160

UNITED STATES PATENT OFFICE 2,156,160

LIGNIN MOLDING COMPOUND

Edgar T. Olson, Marquette, Mich., and Richard H. Plow, Phelps, Wis., assignors to Northwood Chemical Company, Phelps, Wis., a corporation of Wisconsin No Drawing. Application May 17, 1938, Serial No. 208,501

5 Claims. (Cl. 106—39)

This invention relates to molding compounds, and more particularly to molding compounds containing lignin or ligno-cellulose.

In copending application Ser. No. 208,499, filed May 17, 1938, there is disclosed a process for converting wood and other fibrous vegetable materials, that is, lignin-cellulose containing substances, into substances ranging from substantially pure lignin, that is, 90% to 95% of lignin and 5% to 10% of cellulose and humic acids, to about 60% of lignin and about 40% of cellulose. By the same process ligno-cellulose substances may be made containing about 40% lignin and about 60% cellulose.

According to that process, finely divided wood and other fibrous vegetable materials are mixed with dilute sulphuric acid, i. e., a solution containing between about .4% and about 5% of acid, in the ratio of from 5 to 10 parts of such acid to one part of the dry fibrous material. Then the mixture is subjected to pressures ranging between about 90 pounds and about 1000 pounds per square inch, while being heated for between about 2 minutes and about 5 minutes at between about 165° C. and about 280° C., depending on the pressure. By this treatment the wood or other fibrous vegetable material is hydrolyzed with the production of lignin or ligno-cellulose substances. At the same time part of the cellulose is degraded, that is, it is broken down into a variety of compounds such as cellobioses, hemicelluloses and other complex polysaccharides. Also part of the sugars present are polymerized and form insoluble resins.

These lignin containing substances have certain properties which fit them for the manufacture of useful articles when they are molded under heat and pressure. However, they also possess certain properties which interfere with the making of satisfactory molded articles. For example, these substances do not readily flow in the mold and hence it is difficult to cause them to fill the mold completely and to the proper depth in the various parts of the mold. Furthermore, the resulting articles are not as strong as is desirable and the molding and curing time is quite long.

We have discovered that the valuable molding properties of lignin containing compounds can be retained and the foregoing disadvantages may be avoided by mixing lignin substances, such as those above specified, in a finely divided, dry condition with suitable plasticizers in proper amounts and keeping the mixture substantially free from mineral acids.

In carrying out the present invention, the lignin containing substances, for example those resulting from the hydrolyzing process above described, are dried to remove substantially all moisture therefrom and are then in a finely divided or powdery condition. The dry substance is mixed with one or more plasticizers, in quantities suitable for the purpose, and the mixture is then placed in a mold of the desired form where it is heated to temperatures between about 140° C. and about 200° C., and subjected to pressures which may range from about 2000 pounds to about 7500 pounds per square inch. The application of such temperature and pressure for a short length of time, depending somewhat upon the size of the article being molded, will convert the mixture into a hard, strong, resinous like body which completely fills the mold, which will not warp or shrink, and which is substantially free from blisters. Such articles are much stronger than those made from the lignin containing substances without the use of a plasticizer and can be molded and cured in much shorter length of time without blistering. By the term "cured" is meant that the material is thermo setting, that is it becomes infusible when molded under heat and pressure as above specified and can not be remolded.

We have found that there are many organic compounds which can be used as plasticizers for lignin containing substances and for the sake of clarity and brevity, particularly in the claims, we have used the term "organic plasticizer" herein to means plasticizers which are suitable for the foregoing purposes. The following compounds are "organic plasticizers" within the meaning of that term as used in this specification:—

(1) Anhydrides:
    (a) Acetic anhydride
    (b) Lactic anhydride
    (c) Lactide
    (d) Propionic anhydride
    (e) Butyric anhydride
    (f) Diglycollic anhydride
    (g) Succinic anhydride
    (h) Phthalic anhydride (2) Chlorides:
    (a) Acetyl chloride  } Acid chlorides
    (b) Propionyl chloride
    (c) Carbon tetrachloride
    (d) Mono, di, tri, and tetra chlor ethane
    (e) Chlor propiones
    (f) Chlor acids, i. e., chlor acetic and alpha and beta chlor Propionic acid, also chlor lactic acid
    (g) Ethylene chlorhydrin (3) Esters:
    (a) Dibutyl phthalate
    (b) Ethyl glycollate
    (c) Mono acetic acid ester of ethylene glycol (4) Hydrocarbons or combinations of the following:
    (a) Indene
    (b) Fluorene
    (c) Cymene
    (d) Mesitylene (5) Alcohols:
    (a) Glycol
    (b) Glycerol
    (c) Sorbitol
    (d) Manitol (6) Phenols:
    (a) Phenol
    (b) Cresol, ortho, meta and para
    (c) Cathechol
    (d) Resorcinol (7) Aldehydes:
    (a) Benzaldehyde
    (b) Furfural
    (c) Acetaldehyde (by condensation with lignin)
    (d) Aldol (8) Amines and amides:
    (a) Aniline
    (b) Ethanolamine
    (c) Methanolamine
    (d) Triethanolamine
    (e) Pyridine
    (f) Lactamide
    (g) Acetamide (9) Tars and pitches:
    (a) Insoluble wood tar (phenolic in character)
    (b) Soluble wood tar (ketonic and aldehydic in character)
    (c) Hard and soft wood pitch any flow point
    (d) Coal tar and pitch
    (e) Petroleum tar and pitch
    (f) Gilsonite (asphalt)

(10) Sugars:
    (a) Dextrin
    (b) Resins resulting from sugars formed in wood hydrolysis

(11) Resins:
    (a) Cumar-indene resin
    (b) Aniline furfural resin
    (c) Phenol formaldehyde
    (d) Poly-styrene
    (e) Urea-formaldehyde The dry lignin containing compounds will absorb varying percentages by weight of the plasticizers above mentioned. We prefer to use between about 5% and about 16% of the plasticizers of the foregoing classes Nos. 1 to 8 inclusive, but find that the percentages of plasticizers of the above classes Nos. 9, 10 and 11 may be used in amounts up to about 50% by weight of the dry lignin containing substance.

Fillers, such as wood flour, cotton fiber, asbestos fiber and the like, and equivalent materials, may be compounded with the mixture of lignin containing substances and plasticizers if and when desired.

We have found that the presence of water in molding compounds which include lignin containing substances, is to be avoided because of the tendency of the molded article to shrink or warp when moisture is present in the mixture. We believe that this disadvantage is traceable to such presence of water in the mixture which is molded. Our compositions do not include moisture as such and do avoid those disadvantages in the molded articles resulting therefrom.

We have also found that mineral acids in molding compositions in which lignin containing substances are present serve no useful purpose and do possess the disadvantage that the acids tend to corrode the molds. For these reasons we exclude mineral acids from our molding compositions.

Having thus described the present invention so that others skilled in the art may be able to understand and practice the same, we state that our invention is defined in what is claimed.

What is claimed is:

1. A thermo-setting molding compound comprising a finely divided substance which is substantially dry and substantially free from sulfur and mineral acids and which contains between about 95% and about 40% of lignin and between about 5% and about 60% of degraded cellulosic non-ligneous material, and which is formed by mixing finely divided lignin cellulose containing material with several times as many parts of dilute sulfuric acid and heating the mixture under a pressure of about 90 to about 1000 lbs. per square inch at a temperature of about 165° C. to about 280° C. for a period of from about two minutes to about five minutes, and an "organic plasticizer," said composition being capable of being molded into an article of the desired form when heated to between about 140° C. and about 200° C. and subjected to pressures from about 2000 lbs. to about 7500 lbs. per square inch in a mold.

2. A thermo setting molding compound comprising a finely divided substance which is substantially dry and substantially free from sulphur and mineral acids and which contains lignin and between about 5% and about 60% of degraded cellulosic non-ligneous material and which is formed by mixing finely divided lignin-cellulose containing material with several times as many parts of dilute sulphuric acid and heating the mixture under a pressure of about 90 to about 1000 lbs. per square inch at a temperature of about 165° C. to about 280° C. for a period of from about two minutes to about five minutes, and between about 5% and about 50% of an "organic plasticizer", said composition being capable of being molded into an article of the desired form when heated to between about 140° C. and about 200° C. and subjected to pressures from about 2000 lbs. to about 7500 lbs. per square inch in a mold.

3. A thermo setting molding compound comprising a finely divided substance which is substantially free from sulphur and mineral acids and which contains lignin and between about 5% and about 60% of degraded cellulosic non-ligneous material and which is formed by mixing finely divided lignin celluose containing material with several times as many parts of dilute sulphuric acid and heating the mixture under a pressure of about 90 to about 1000 lbs. per square inch at a temperature of about 165° C. to about 280° C. for a period of from about two minutes to about five minutes, and between about 5% and about 50% of an "organic plasticizer" composed of resins resulting from sugar formed from wood hydrolysis, said composition being capable of being molded into an article of the desired form when heated to between about 140° C. and about 200° C. and subjected to pressures from about 2000 lbs. to about 7500 lbs. per square inch in a mold.

4. A thermo setting molding compound comprising a finely divided substance which is substantially dry and substantially free from sulphur and mineral acids and which contains lignin and between about 5% and about 60% of degraded cellulosic non-ligneous material and which is formed by mixing finely divided lignin cellulose containing material with several times as many parts of dilute sulphuric acid and heating the mixture under a pressure of about 90 to about 1000 lbs. per square inch at a temperature of about 165° C. to about 280° C. for a period of from about two minutes to about five minutes, and between about 5% and about 50% of an "organic plasticizer" selected from the herein specified classes of tars and pitches, sugars and resins, said composition being capable of being molded into an article of the desired form when heated to between about 140° C. and about 200° C. and subjected to pressures from about 2000 lbs. to about 7500 lbs. per square inch in a mold.

5. A thermo setting molding compound comprising a finely divided substance which is substantially dry and substantially free from sulphur and mineral acids and which contains lignin and between about 5% and about 60% of degraded cellulosic non-ligneous material and which is formed by mixing finely divided lignin cellulose containing material with several times as many parts of dilute sulphuric acid and heating the mixture under a pressure of about 90 to about 1000 lbs. per square inch at a temperature of about 165° C. to about 280° C. for a period of from about two minutes to about five minutes, and between about 5% and about 16% of an "organic plasticizer" selected from the herein specified classes of anhydrides, chlorides, esters, hydrocarbons, alcohols, phenols, aldehydes and amines, said composition being capable of being molded into an article of the desired form when heated to between about 140° C. and about 200° C. and subjected to pressures from about 2000 lbs. to about 7500 lbs. per square inch in a mold.

EDGAR T. OLSON.
RICHARD H. PLOW.